5834X
Short & Bradford.
Diving Armor.
Patented Feb. 18, 1830.
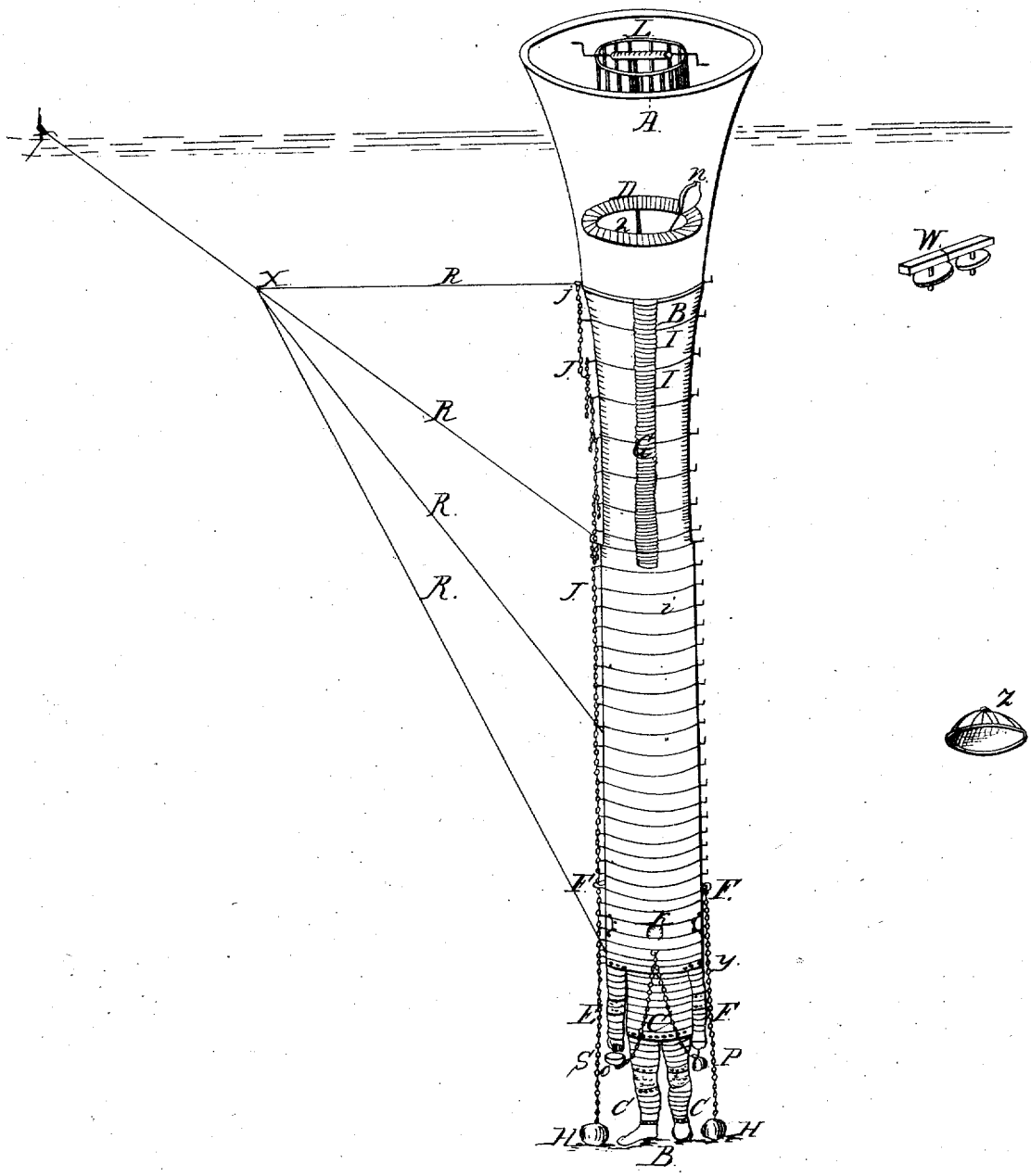
THE GRAPHIC CO. PHOTO-LITH. 39 & 41 PARK PLACE, N.Y.

Sewall Short and Noah Bradford of Barnstable Mass.

Letters Patent.

The Schedule referred to in these Letters Patent and making part of the same con-
taining a description in the words of the said Sewall Short and Noah Bradford
themselves of their improvement the machine or apparatus for exploring water &c denominated the
Submarine Explorer.

To all to whom these presents shall come.

Be it known that We Sewall Short and Noah Bradford both of Barnstable
in the County of Barnstable and Commonwealth of Massachusetts have invented a
new and useful machine or apparatus for the purpose of exploring water, walking
under water and regaining property lost therein which they have denominated the
Submarine Explorer. That the following is a full and exact description of the
construction and operation of the said machine or apparatus as invented by us. Viz
A Boat or Buoy (A in the drawing hereto annexed) is constructed of Cork (or oth-
er suitable materials) in the form of an inverted Bell though less flaring. of suf-
ficient dimension to support the machine and hold the necessary number of men to
work it. say five feet diameter at top and three feet diameter at the bottom &
five feet in height and covered with leather or other materials) which shall render
it impervious to the water and also lined with it. To the bottom of this (at
B) is attached by screws (or rivets) a tube or hose (B.B.) constructed of leather
or other ~~suitable~~ materials, made water proof and of sufficient thickness to resist
the pressure of the water diminishing in size downward from two to five feet. when
it is reduced to two feet diameter and of this size continues till within the height
of a mans shoulders of the lower end (Y.) when two branches (C.F.) resembling
somewhat the sleeves of a garment, and fitted to receive a mans arms are attached
to it by screws or rivets. said hose continues the same size or nearly the same size
to within about three feet of the bottom (b) when it is divided into two parts fit-
ted to receive a mans legs & feet (C.C.) The seams of this hose are secured by
screws or rivets and the hose is kept extended by means of iron hoops on the in-
side secured to the covering by screws (or rivets) and increasing downwards in strength
and frequency in proportion to the increased pressure of the water. In the arms
and legs the hoops (if hoops are used) are kept in place by iron splinters fastened
to each by screws or rivets, in which splinters a joint is made at the elbow and knee Drawing

X3834 to facilitate the motion of the limbs in walking and working. To distend the covering
of the arm the inventor has used spiral wires instead of hoops, and thinks them
preferable as they admit of greater freedom and variety of motion. and perhaps might
be found most convenient for the legs also. The machine is sunk by means of weights
(H & H.) suspended by chains from the hooks (F F) screwed into a hoop and furnish-
ed with a spring to prevent the chain from being easily disengaged. It aid, it may
be necessary or convenient to suspend weights from each of the hooks or ring bolts
which are fixed in the hoops inside and outside being three in each hoop outside
and perhaps the same inside. To prevent being elevated and depressed by the undu-
lations of the water the hose is contracted by folds for the distance of six feet from
the Buoy. so that the Buoy may rise with any ordinary wave without affecting
the lower part of the apparatus. and to restore its contraction when the wave subsides,
three spiral wires (like G.) of sufficient strength to effect this object without mis-
ing the machine are placed on the outside and secured to the hoops by screws or rivets
and extend the distance of six feet downward. To prevent the hose from being overstrain-
ed in any particular part. chains are extended from top to bottom and attached to
the said hooks or rings and made to bear equally on all the hoops as high as the spiral
wires from which place to the Buoy they are so slackend as not to take effect till the
hose becomes extended when they do. and prevent a strain of the hose. About two thirds
of the distance from the top to the bottom of the Buoy. there is a platform which was
intended to be represented by the figure D. exhibiting a section of the Buoy.) having
in its centre an aperture (Q.) of the diameter of two feet round which is an iron
railing on the top of which is a windlass (I.) on this platform the men who aid
the operator stand. Thro this aperture the operator descends by stepping on the hoops
and carries with him fastened round his body a rope from the windlass and arranges
himself in the parts of the bottom adapted to his body and limbs. The windlass and
rope facilitate and hasten his ascent in case of sickness or accident. To enable him
to see external objects three lights of thick glass (as K.) are put in one in front
and one on each side. and set in iron brass or copper frames and secured to the hose
by (screws or) rivets. To enable him to use his hands with ease a piece of leather gloves
or mittens are fitted by screws or rivets to the middle of the iron cuffs of the sleeves
As the pressure of the water may check circulation and occasion cold. it will be
necessary to occasionally withdraw them, and to prevent the pressure of the water from [illegible]

in the gloves or mittens, two (cast iron) brass caps (P & C) are made to screw on the iron cuffs and suspended by chains from hooks or rings in the hoops. with one hand (C) he screws the cap (C.) on the arm F then with the remaining hand takes the cap P. by a small pintal or handle fixed to the inside. and draws it after his hand and screws it inside. A ring of india rubber is used round the wrist to aid in resisting the pressure of the water. when the hand is in the glove. In case fresh air is required it is supplied by a tube extending from the Buoy to the head of the operator inside and inflated by a bellows (N) (or an air pump). To keep the apparatus in a perpendicular position when placed in the tide or current ( ) warps or guy ropes (R. R. &c.) are fastened to several of the hooks or rings in the hoops terminating at a proper distance (x) and extending to a vessel or other object to which it is secured (if screws are used in securing the seams they are made with oblong heads an inch in length and placed contiguous to each other. On the inside, circular nuts one inch in diameter are screwed which consequently meet each other and make it perfectly tight. On the upper part how ever where the spiral wires are placed to facilitate the folding the heads and nuts of the screws are made smaller. An idea of the screws may be obtained from the figure W. the drawing which accompanies this represents an apparatus about eighteen feet in length. but the length may be greater or less according to the depth of the water in which it is intended to work. To enable him to descend to a greater depth, the hose is unscrewed from the Buoy. In case of any slight leakage thro the apparatus by which the situation of the operator is rendered wet and uncomfortable. the water is taken out by a small hydraulic machine in the Buoy. To enable him to descend to a greater depth the apparatus is unscrewed from the Buoy and also from the lower part, just above the head, (at I. I.) and to protect him from the water a cast iron (or brass cap) (Z) is screwed on in its place at I. To supply him with air a small hose connected with an air pump in the Buoy passes into the apparatus just below the operators head. another similar tube passing thro said cap and screwed into it extends to the Buoy where by a stop cock the impure air is let off as prudence requires. To enable him to change position, hooks are attached to the several hoops, from any of which he may suspend the weights and thus form any attitude he may wish to assume. To raise him to the sur

[illegible] X5834 face when required ropes are fastened to as many of the hooks as necessary, writ[illegible]
over his head and attached to the windlass in the Buoy. What we claim
as new and for which we ask an exclusive right, is the formation of a float
ing Boat or Buoy in the form of an inverted Bell or in any other convenient
shape and the attaching thereto a tube of leather or other material made im-
pervious to water and extending from the surface to the bottom of the water
and of sufficient dimensions for a person to ascend and descend: and the
furnishing said tube, at bottom with the kind of dress or covering above de
scribed, so that the whole shall form a water tight case or bag in which
respects it differs from all other diving apparatus before known.
In Witness whereof we have hereunto set our hands and seals this twenty
third day of January AD Eighteen Hundred and thirty Witness
[illegible] Timothy Reed
[illegible] Hugh Montgomery Sewall Short
Noah Bradford.

(1665 words)